Oct. 29, 1957 W. G. HEIN 2,811,039
DEPTH INDICATING APPARATUS FOR LARGE TANKS
Filed June 7, 1954 2 Sheets-Sheet 1
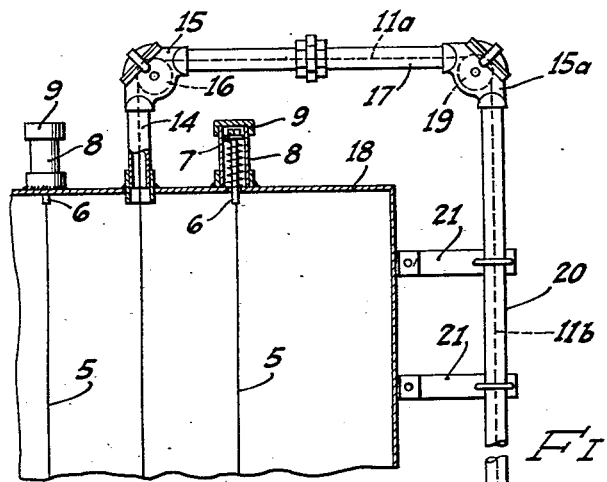
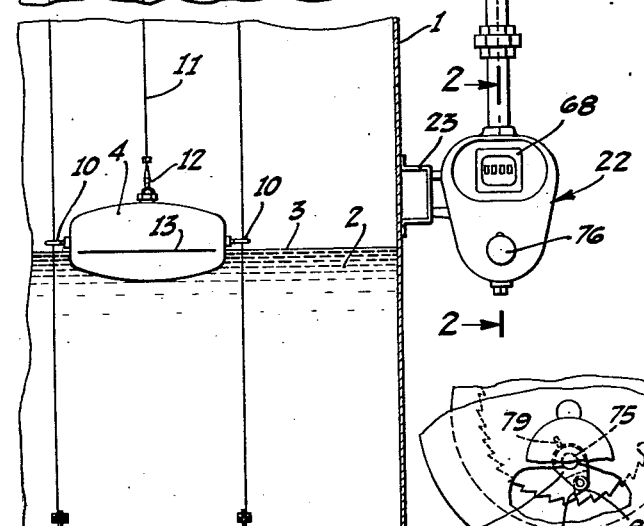
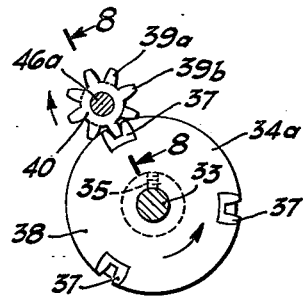
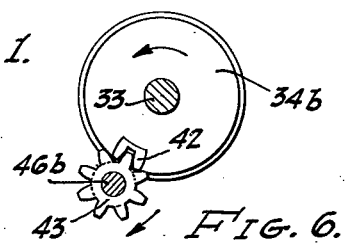
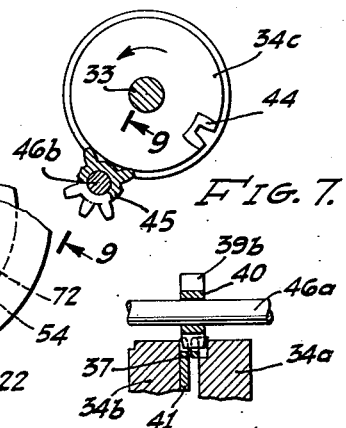
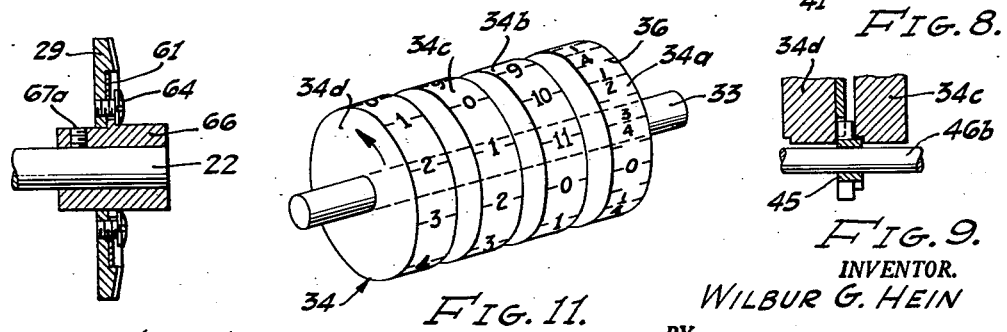
INVENTOR.
WILBUR G. HEIN
BY
*Francis D. Ammen*
ATTORNEY.

Oct. 29, 1957  W. G. HEIN  2,811,039
DEPTH INDICATING APPARATUS FOR LARGE TANKS
Filed June 7, 1954  2 Sheets-Sheet 2
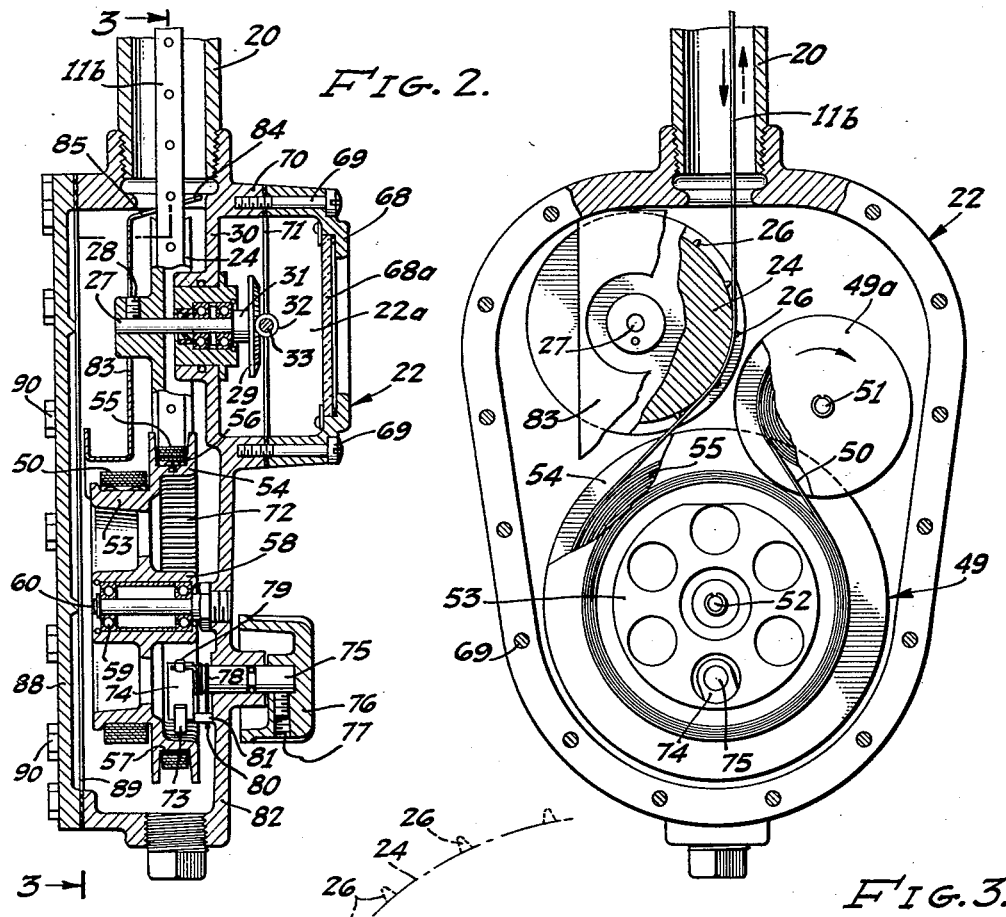
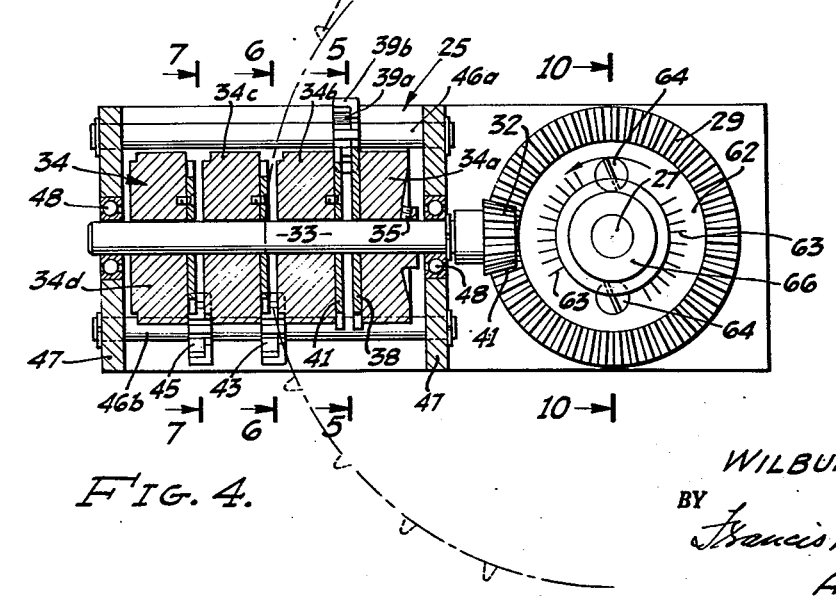
INVENTOR.
WILBUR G. HEIN
BY
Francis D. Ammen
ATTORNEY.

United States Patent Office 2,811,039
Patented Oct. 29, 1957

2,811,039

DEPTH INDICATING APPARATUS FOR LARGE TANKS

Wilbur G. Hein, Long Beach, Calif., assignor to Vapor Recovery Systems Company, a corporation of California Application June 7, 1954, Serial No. 434,851

1 Claim. (Cl. 73—321)

This invention relates to apparatus for indicating the depth of a liquid within a tank, and is particularly useful as part of the equipment for tanks of the petroleum and chemical industries and others where tanks for liquid products are employed.

It is the present practice to provide such tanks with a float guided to travel in a vertical plane on the surface of the liquid as it rises or falls. A metal tape attached to the upper side of the float passes through an opening in the tank top, and is guided on sheaves over to the side of the tank and then down past or through a reading box where the tank gauger can read the scale at "bench-mark" or fixed point that the scale passes in its travel, down when the tank is filling and up when the tank's contents is being drawn off.

One of the objects of this invention is to provide indicating mechanism controlled by a flexible line or tape attached to a float such as referred to above, and which will give an accurate reading in a unit of measure and a small fraction of the unit of measure, for example, that will give a reading in feet, inches and a small fraction of an inch.

In order to accomplish this with such apparatus, its mechanism must function in such a way as to insure that at any point in the up-and-down travel of the float it must rest on and actually float on the surface of the liquid. In other words, the apparatus must function so that the measuring line or tape shall be maintained with constant tension, and without any slack in it, but also without developing any excessive tension in the line or tape. To accomplish this is one of the objects of the invention.

Further objects of the invention will appear hereinafter from a careful reading of the following specification and study of the accompanying drawing.

The invention consists in the novel parts and combinations of parts to be described hereinafter all of which contribute to produce an efficient depth indicating apparatus for tanks.

A preferred embodiment of the invention is described in the following specification, while the broad scope of the invention is pointed out in the appended claim.

In the drawing:

Figure 1 is a schematic vertical section through a tank, and illustrating a depth indicating apparatus embodying this invention.

Figure 2 is a vertical section taken about on the line 2—2 of Figure 1, and further illustrating details of the mechanism located at a reading box, that is, the point where the depth of the liquid is indicated.

Figure 3 is a section taken about on the line 3—3 of Figure 2 in the upper part of the view, while the remainder of the view shows the parts of the mechanism which are in view when the rear cover of the housing has been removed. However, certain moving parts of this mechanism are broken away and shown partially in section.

Figure 4 is a longitudinal vertical section taken along the axis of the shaft of the indicating mechanism and particularly illustrating the details of the indicating dials, the movements of which are effected by the measuring line or tape that passes this mechanism.

Figure 5 is a vertical cross-section taken about on the line 5—5 of Figure 4 and particularly illustrating the carrying mechanism that carries over from the wheel or dial of lowest denomination that (indicating fractions of a unit of measure) carries over to the wheel of next higher denomination indicating the measurement in units of the next higher denomination.

Figure 6 is a similar vertical section taken on the line 6—6 of Figure 4 and particularly illustrating the carrying mechanism that carries over from the "inch wheel" to one of next higher denomination; for example, a wheel or dial that indicates feet.

Figure 7 is a vertical section taken on the line 7—7 of Figure 4 and particularly illustrating the carry-over mechanism that carries from the "units" wheel to the "tens" wheel.

Figure 8 is a fragmentary section on the line 8—8 taken in a radial plane, further illustrating the carrying mechanism from the "fraction" wheel or dial to the dial of next higher denomination.

Figure 9 is a fragmetary section on the radial line 9—9 of Figure 7 and further illustrating the carrying mechanism from the "units" wheel to the "tens" wheel or dial.

Figure 10 is a cross-section taken on the line 10—10 of Figure 4 illustrating means for adapting the apparatus for use with a liquid of a different specific gravity from that for which the indicator was set.

Figure 11 is a perspective of the dials of the indicator.

Figure 12 is a fragmentary elevation of the front of the wall of the housing of the reading box and illustrating means for testing the condition of the measuring line.

Referring more particularly to the parts, 1 indicates a tank such as referred to, for containing a liquid 2 of any kind, for example, petroleum derivatives such as gasoline, or any other kind of liquid.

On the surface 3 of the liquid a float 4 is indicated, which is guided to move up or down in a vertical plane by means of spring-biased taut guide wires 5. The upper ends of these wires are attached to pull-pins 6 the upper ends of which carry heads 7, respectively, that are slidably mounted in short barrels 8; each of these barrels is closed above by a screw cap 9.

If the liquid 2 is being replenished in the tank the float 4 will rise, being guided upward by two eyes 10 fixed to the ends of the float and running on the guide wires 5. As the float rises, a measuring line or tape 11 attached to the upper side of the float by a connection 12 will "give" to the line. There is no slack, because the line is immediately taken up by means to be described hereinafter.

In this connection it should be understood that preferably there is only slight tension in the line 11, but the degree of this tension is constant. If the tension were not uniform the height of the float 4 with reference to the liquid level would vary. In other words, if the line 13 indicated on the side of the float marks the limit of immersion of the bottom of the float, then at no time should the line exert any different degree of tension. Such a change would change the actual level of the float, and bring an error into the reading of the dials of the indicator.

This line or tape 11 leads up through a short standpipe 14, past an elbow 15 and into a horizontal run 11a of the line, after passing over a guide sheave 16. The run 11a is located within a horizontal housing pipe 17 which is disposed substantially radially above the tank top or head 18, and thence passes through an elbow 15a similar to the elbow 15 that houses a sheave 19 similar to the sheave 16.

From the sheave 19 a vertical extension 11b of the line or tape passes down a tubular housing 20 at the side of the tank supported on brackets or arms 21, from the tank, its lower end being attached to the housing of a reading box 22, as shown in Figure 1, supported on a bracket 23 secured on the side of the tank.

Referring now to Figures 2 and 3, the tape 11, that is, its extension 11b, passes into the upper side of the reading box 22, and passes around the periphery of a contact wheel or driving pulley or spur-wheel 24, the rotation of which actuates the indicator mechanism 25 shown in Figure 4.

The tape and face of the contact pulley 24 are provided with co-ordinated means whereby there can be no slippage or creeping of the tape on the face of the wheel. In other words, as each linear foot of tape passes the pulley 24 it will advance the pulley through an angle subtended by one foot of arc measured circumferentially on the face of the pulley. For this purpose a tape is provided with uniformly spaced perforations (see Figure 2) which register with, and receive, small radial pins or spurs 26. The driving pulley 24, as indicated in Figure 2, is secured to its shaft 27 by a small set-screw 28; and this shaft extends into the indicator chamber 22a of the housing 22 where it carries a large bevel gear 29 located beyond the partition wall 30 of the reading box in which a bearing such as the ball bearing 31 is provided for the shaft.

Referring now to Figure 4, the bevel gear 29 meshes with a bevel pinion 32 on the shaft 33 of the indicator 25.

The indicator illustrated carries four wheels or dials indicated collectively by the reference numeral 34. These dials 34 include a dial 34a of lowest denomination and this is the only one of the dials that is rigid on the shaft. In the present instance this "fraction" dial is secured to the shaft by a small set-screw 35.

Referring to Figures 5 and 11, the dial 34a is graduated on its face in a continuous scale indicating fractions in a progression increasing by eighths of an inch. They are indicated by unnumbered small lines or divisions 36 disposed midway between similar marks or lines that are numbered progressively, to indicate one quarter-inch, one half-inch, three-quarter inch, and zero; and there are three of these inch measuring divisions on this "fraction" dial 34a, which is the dial of the lowest denomination included in the indicator mechanism.

The fraction dial carries the complete inch divisions, and it carries over to the "inch" wheel 34b as each "inch" advance occurs on the dial 34a. For this reason, I provide three carrier dogs 37 on the periphery of the dial. These dogs project from the lateral inner face 34a of this dial which face is adjacent to the dial 34b (see Figure 4), and as each of these carrier-dogs passes an upper counter-shaft 46a of the indicator mechanism, it encounters one of the short teeth 39a of the carrier pinion 40 and rotates this pinion through two tooth spaces. This is a conventional carrying pinion, and has relatively short teeth 39a alternating with relatively long teeth 39b. The socket of the dog 37 co-operates only with the long teeth 39a to rotate the carrier pinion 40, and the relatively long teeth mesh with the teeth of a gear wheel 41 on the "inch" dial 34b, and rotates it through one division of its scale which is divided into twelve spaces, each space indicating one inch of measurement. So the dial 34b indicates inches from 1 up to 11 in the depth measurement.

At each revolution of the inch dial 34b the carrier dog 42 operates a carrier-pinion 43 to carry over to the units wheel 34c, that indicates feet, but as it takes twelve inches to make a foot, the carrier must be actuated twelve times to advance the units "feet" indicator through one space, e. g. from 8″ to 9″. A carrier pinion 45 like the carrier pinion 43 carries over from the "units" wheel 34c to the "tens" wheel 34d through the agency of a slotted carrier dog 44 on the dial 34c.

These two carrier pinions 43 and 45 are freely rotatable on an arbor 46b that extends longitudinally between the end frame members 47 of the indicator mechanism. These end frame members 47 have roller bearings 48 for the shaft 33, as shown in Figure 4.

In order to maintain the constant tension which is necessary to insure that the float will always rest with the same degree of immersion, that is to say, always with line 13 on the float in line with the liquid surface 3, I employ a device obtainable on the market and known to the trade as a negator motor. This device is indicated in Figure 3, by the reference numeral 49. It comprises what is known as a negator spring 50 which is disposed in coils around a fixed shaft 52 to which the innermost wrap of the coil is attached; or the inner end of the spring 50 may be attached to a drum 53 that is rigid with the shaft or arbor 52. The outer portion of this spring 50 crosses a line joining the arbor 51 to the shaft 52 of a sheave 49a on which it wraps.

The sheave 53 is part of a "duplex" sheave, that is to say, it is integral with another sheave 54 which operates as a take-up pulley or storage sheave for the tape 11 which wraps around it in coils 55, as shown in Figures 2 and 3, the extreme end of inner wrap 56 of the coil 55 is secured to the peripheral face 57 of the take-up sheave 54.

As will appear from Figure 2, these two sheaves have a common hub 58 which is rotatably mounted on two ball bearings 59 supported on a center pin or shaft 52.

This negator motor 49 functions so as to maintain constant tension in the line 11 at its point of attachment to the float, and compensates for any additional pull developed by any increase of weight in the length of line that runs down into the tank when the liquid level falls. In other words, it maintains a constant pull-up force at the float; and this assures the same degree of immersion for the float at all levels of the liquid within the tank. In order to enable an adjustment in the indicator to be made to insure accuracy of the reading when a liquid of a certain specific gravity is stored in the tank, I provide the face 61 of the bevel gear 29 with a flat annulus 62 having two diametrically opposite arcuate scales 63 upon it, one of which may correspond to light gravity liquids and the other to relatively heavy gravity liquids. These scales may be located at the inner edge of the adapter ring or annulus 62, as indicated in Figures 4 and 10.

Two screws 64 are provided for facilitating the calibrating of the counter mechanism by holding the dual scale 63 adjustably in any shifted position if and when the liquid in the tank has been changed to a different specific gravity from that in the tank originally when the counter was being set-up to give a correct reading for the actual depth of liquid when the counter was first put into use. A collar 66 is provided which is the hub for the bevel gear to the shaft 27. The manner of using this adjustment to insure correct indicating by the indicator will be presently described.

The necessity of the use of the adjustment scale 63 is evident because when the specific gravity of the liquid is less than that which the indicator has been set for, the float would immerse its bottom side to a lower level in the liquid, and vice versa. In effecting an adjustment it is necessary to loosen set-screws 67a (see Figure 10), in the hub 66 of bevel gear 29 to permit it to be revolved in one direction or the other to give a correct reading of the dials for the depth of liquid then held in the tank; and then to make the set-screw tight in the new position of the wheel 29.

Access can be had to the interior of the housing 22; this may be accomplished, by removing a forwardly disposed window frame 68, carrying clear glass panes 68a (see Figure 2), by removing the long machine screws 69 that are threaded into a seat 70 for the machined inner face of the window frame, which is clamped up against the gasket 71.

In all gages using tape for measuring the depth of liquid in tanks it is necessary to provide a testing equipment, constructed so as to enable an attendant to exert a slight increase in tension in the tape to ascertain whether it is running freely over its guide pulleys or sheaves. In order to accomplish this the inner face of the rim of the sheave 54 is provided with inclined teeth 72, see Figures 2 and 12.

These teeth co-operate with a gravity pawl 73 pivotally mounted on a pawl-arm 74, which is rigidly secured to a shaft 75 that carries a knob 76 for rotating it at will. This knob may be secured rigidly to the projecting end of the shaft 75 by means of a set-screw 77, see Figure 2.

A coil spring 78 wraps around the inner end of the shaft 75 and has one end attached to an anchor pin 79 on the upper side of the arm 74, and the other end of the spring has an extension 80 the side of which thrusts against a fixed pin 81 that projects inwardly from the forward wall 82 at the lower end of the housing 22. The spring 78 exerts its force in a direction to hold the arm in a position to press the lower end of the pawl, below its pivot, against the fixed pin 81. This holds the lower end of the pawl normally out of contact with the teeth 72, in the position of rest; but by rotating the knob 76 in a clockwise direction the pawl will move away from the pin 81 and drop down by gravity so that it will engage the teeth 72 and cause the sheave 54 to rotate in a clockwise direction, thereby taking up tape into the coils 55. If the tape is co-operating properly throughout its entire path of travel, there will be little resistance to its movement by means of this knob.

In that case the gage tester will know that the tape is working properly and freely throughout its course of travel, and he can then release the knob 76. This will permit the float to drop back to its normal position of rest, floating on the liquid.

Cover 88 is secured against gasket 89 by bolts 90.

In order to keep the tape clean as it runs into the housing 22, the interior of the housing is provided with a screen 83 made of thin sheet metal, or the like, that has an inclined extension 84 at its upper end with a narrow wiper-slot 85 through which the tape passes down.

Many other embodiments of this invention may be resorted to without departing from the spirit of the invention.

I claim and desire to secure by Letters Patent:

In an apparatus for indicating the depth of a liquid in a large tank, the combination of a float resting on the surface of the liquid, so as to rise and fall with the surface of the liquid, an indicator located at the exterior of the tank at a point accessible to a reader of the indicator, said indicator having all its dials disposed coaxially to each other and including a dial indicating tens of feet, a units dial indicating feet up to ten feet, a dial indicating inches up to, and including 12, and a fraction dial indicating fractions of an inch, with means for carrying from the fraction dial to the units dial, and from each dial of lower denomination to the dial of next higher denomination; all of said dials having cylindrical faces bearing the depth indicating figures, and a tape having perforations therein attached to the upper side of the float, with means for guiding the same to the roof of the tank and to the said indicator, said indicator having a spur-wheel on which the tape runs and the spurs of which engage the perforations in the tape; means for driving said fraction wheel of said indicator from said spur-wheel, and means beyond said spur-wheel to which the said tape extends for exerting a varying increasing pull upon the tape at the indicator to compensate for the increased weight of the tape between the roof and the float as the level of the surface falls, so that a constant degree of submersion of the float is maintained and thereby insuring that the dials of the indicator give a correct indication of the depth of the liquid in the tank.

References Cited in the file of this patent

UNITED STATES PATENTS

| | | |
|---|---|---|
| 776,315 | Friez | Oct. 27, 1904 |
| 1,689,941 | Brooks | Oct. 3, 1927 |
| 1,723,173 | Huggins | Aug. 6, 1929 |
| 1,866,902 | Overmire | July 12, 1932 |
| 2,110,490 | Renner | Mar. 8, 1938 |
| 2,348,362 | Rudolf | May 9, 1944 |